Dec. 17, 1935. I. HECHENBLEIKNER 2,024,733
CONVERTER
Filed July 26, 1929
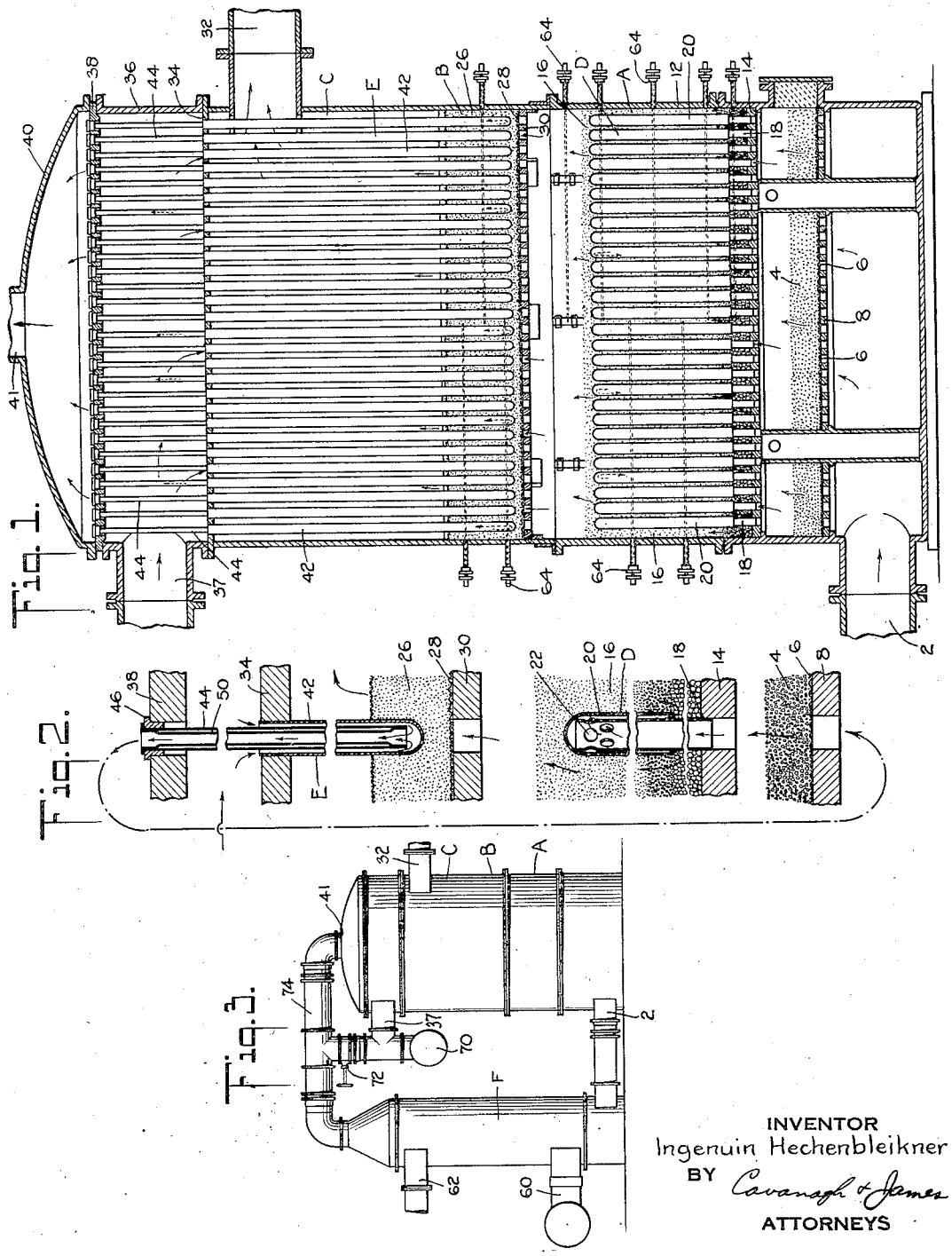
INVENTOR
Ingenuin Hechenbleikner
BY Cavanagh & James
ATTORNEYS Patented Dec. 17, 1935

2,024,733

UNITED STATES PATENT OFFICE 2,024,733

CONVERTER

Ingenuin Hechenbleikner, Charlotte, N. C., assignor, by mesne assignments, to Chemical Construction Corporation, a corporation of Delaware Application July 26, 1929, Serial No. 381,177

10 Claims. (Cl. 23—288)

This invention relates to a method and means for catalytic conversion in the vapor phase, and more particularly for the catalytic oxidation of sulphur dioxide for the manufacture of sulphuric acid anhydride by the contact process.

In catalytic apparatus of this nature temperature control presents a major problem because the catalytic reaction is relatively sensitive to temperature, and it is necessary not only to obtain conversion of the reaction gases, but to prevent reversion of the already converted gases.

The problem of temperature control itself has been investigated to a considerable extent and may now be considered fairly well understood. To realize proper control it has been suggested to separate the converter system into a plurality of converter stages and to employ temperature controlling media of various kinds between successive stages. Such arrangements cause an undesired complication in the equipment of the plant, and are exceedingly wasteful of energy, for heat obtained from the reaction at one point is dissipated in a special cooling medium, and on the other hand, when heating is necessary this is obtained from a separate heating source.

To obtain the desired results entirely by heat exchange or transfer of heat from points where heat is to be dissipated to points where heat is needed, as a practical matter, presents numerous difficulties, to overcome which compromise arrangements have been suggested such as the converter disclosed in my copending application for a "Converter", Serial Number 298,202, filed August 8, 1928, Pat. No. 1,927,493 issued Sept. 19, 1933, but such an arrangement only takes advantage of the possibilities of heat exchange to a partial extent.

The primary object of my present invention centers about the provision of a relatively compact and relatively self-contained converter system, and a method of operation therefor, which will obviate the foregoing difficulties and which will operate in as efficient a manner as possible while reconciling the conflicting requirements which arise because of the fact that it is desirable, on the one hand, to employ heat exchange for all of the heating and cooling operations needed, and it is desirable, on the other hand, to obtain exceedingly close and exact control of the temperatures at certain phases of the process, which temperatures may not even be constant but rather will vary in accordance with the characteristics of the gases undergoing conversion at any particular time.

More specifically, one object of the present invention is to make possible the utilization of relatively cool reaction gases supplied to the converter, and to preheat these gases substantially to the desired initial reaction temperature without the application of external heat, the reaction heat being used for this purpose. Further objects of the invention are to obtain a preheat temperature which may be controlled within very close limits and which may be a variable dependent upon the strength of the reaction gases, and to make this temperature regulation feasible regardless of whether the desired temperature is above or below that of the reaction gases as preheated by the reaction heat of the converter itself.

A still further object of the present invention is to cool the converted gases within the converter to a relatively low temperature preparatory to absorption of the gaseous anhydride in water.

Still another object of my invention is to obtain automatic gas cooling in a first or main converter stage and to simultaneously obtain an independent and even more precise cooling of the catalyst or contact mass in a subsequent converter stage in order to prevent reversion, while utilizing the reaction gases for both of said cooling operations.

My invention embodies a number of structural features and advantages which themselves constitute objects of this invention, and among these I may mention the provision of a compact converter system in which the gases flow through successive conversion and cooling stages in a direct and unobstructed manner while the cool reaction gases supplied to the converter are fed in counter flow heat exchange relation successively to the converted gases and the several converter stages in an order inverse to the order of the conversion process.

To make possible the desired structural arrangement I prefer to employ heat exchange elements of the type employing concentric outer and inner tubes, the former being closed at one end, and the latter being open ended and extending almost to the closed end of the former, whereby gases may be circulated in heat exchange relation with a surrounding medium which is most conveniently accessible from only one side. These elements, so far as I am aware, have always heretofore been constructed as double acting heat exchange elements, that is to say, heat transfer takes place during the flow of the gas through the element in both directions, the transfer at the time the gas is flowing in the inner tube taking place between the inner and outer tubes, while the transfer at the time the gas is flowing in the outer tube takes place between the outer tube and the surrounding medium, and also between the inner and outer tubes. For perfect counter flow heat exchange relation such a heat exchange element is not entirely satisfactory, and one of the important objects of the present invention resides in the provision of a single acting heat exchange element, suitable for counter flow heat exchange, which is accessible for both the incoming and outgoing gas at one end of the heat exchange elements.

To the accomplishment of the foregoing and such other objects as will hereinafter appear, my invention consists in the conversion method and in the converter elements and their relation one to the other as hereinafter are more particularly described in the specification and sought to be defined in the claims. The specification is accompanied by a drawing in which:

Fig. 1 is an elevation taken in section through a converter embodying my invention;

Fig. 2 is an enlarged detailed section of the heat exchange elements employed in the converter of Fig. 1; and Fig. 3 is an elevation of the converter provided with auxiliary temperature regulating means.

Referring to the drawing the converter system comprises a first converter or conversion stage A, and a second converter or conversion stage B, the chamber of which is relatively greatly enlarged, and the upper portion thereof, generally designated by C, comprises a cooling stage for cooling the converted gases leaving the converter B preparatory to absorption of the cooled gaseous anhydride. The first converter stage A is cooled by double acting heat exchange elements D, while the stages B and C are provided with single acting heat exchange elements E.

Cool reaction gases reaching the converter are first run through the heat exchange elements E, and preheated by the cooling stage C and the conversion stage B. After further temperature regulation, if necessary, the preheated reaction gases pass through an inlet conduit 2 and flow up through a filter body or mass 4 resting upon a screen 6 which in turn is supported by a perforated plate 8. From this filter the reaction gases rise directly into the first conversion stage A.

The first converter stage A is of the automatic gas cooled type, the converter consisting of an enclosing chamber, 12, the bottom 14 of which is perforated to act as a header plate for a nest of double acting heat exchange elements D, which are imbedded in the catalyst or contact mass 16.

As is best shown in Fig. 2 the heat exchange elements D each consist of an inner open ended tube 18, the lower end of which is sealed into header plate 14, and an outer tube 20 the upper end of which is closed. The inner tube 18 extends through the outer tube almost to the closed end thereof, and is in flow communication therewith by means of the open end and the perforations 22. The lower end of the outer tube 20 is open and permits discharge of the reaction gases directly into the contact mass 16.

The final converter stage B carries a catalytic or contact mass 26, which rests upon a gas permeable screen 28 which in turn is supported by a perforated bottom plate or partition 30. In this manner the gases discharged from the first conversion stage A may rise and pass directly into the final conversion stage B, after which the converted gases rise up through the enlarged chamber C and then pass through a discharge conduit 32, leading to a suitable absorption system, before which, if necessary, an externally cooled cooling stage may be interposed.

Above the chamber C there is a perforated partition or header 34, surmounted by a flanged wall section 36, and another perforated partition or header 38, the partitions 34 and 38 and the wall 36 defining a reaction gas inlet enclosure having an inlet opening 37. Above the top partition 38 there is a dome 40, the dome 40 and the partition 38 defining a reaction gas discharge enclosure having a discharge opening 41. The outer tubes 42 of the heat exchange elements E are sealed into the lower header plate 34, while the inner tubes 44 of the heat exchange elements E are sealed into the upper header plate 38.

The construction of the heat exchange elements E is best described with reference to Fig. 2, showing how the outer tubes 42 are closed at their lower ends, while their upper ends are sealed into the header plate 34, while the inner tubes 44 are open ended, the lower ends extending almost to the closed ends of the outer tubes 44, while their upper ends are sealed into the header plate 38, suitable bushings 46 being provided to permit cleaning or removal of outer tubes 42 in case of necessary repairs.

The gas flow circuit is indicated in Figs. 1 and 2, and it will be observed that reaction gases which are received in a cool state are admitted through the inlet opening 37 and flow down the outer tubes 42, then up the inner tubes 44 and out of the discharge opening 41, after which they may be sent directly to the inlet opening 2 of the first converter A.

If the strength of the reaction gases is known the desired preheat temperature may be determined, and the size of the chamber C, the length of the heat exchange elements E, and their penetration into the catalyst 26 may be so determined and interrelated as to obtain this desired preheat temperature. At the same time the counter flow of the cool reaction gases, which are preferably about at atmospheric temperature, serves to cool the converted gases in the chamber C down to a relatively low temperature preparatory to absorption. The depth of penetration of the heat exchange elements E into the catalyst or contact mass 26 determines the degree of cooling and the temperature of the latter, which preferably is kept at that value giving maximum and complete conversion without reversion.

To prevent cooling of the preheated reaction gases flowing up the inner tubes 44 by the cool reaction gases in the inlet chamber 36 and flowing down the tubes 42, and to prevent heating of the converted gases in chamber 6 by the preheated reaction gases in tubes 44, or from another viewpoint, to obtain true counter flow heat exchange, for which it is necessary that the heat exchange elements E be made single acting rather than double acting, I insulate the inner tubes 44 of the heat exchange elements to prevent heat exchange between the inner and outer tubes. This insulation is most simply provided by using a double tube, as is best shown in Fig. 2, the tube 44 being additionally provided with another inner tube 50 which is spaced from the tube 44 so as to provide a dead air or gas spaced between the walls, thereby insulating them. This heat insulation permits of maximum heating of the cool reaction gases and maximum cooling of the converted gases because it prevents ultimate heat exchange between the preheated gases flowing up the inner tubes and the cooled converted gases, the latter being kept in contact with only the cold reaction gases before they have been appreciably heated.

It will be understood that by connecting the discharge opening 41 of the preheater with the inlet opening 2 of the first conversion stage the converter may be made to operate successfully, and then is entirely self-contained, it receiving cool reaction gases and delivering relatively cool converted gases for absorption. However, in practice there are additional problems which arise, one of which is to start up the converter after a shut down, for which purpose auxiliary preheating is necessary. Another is that the exact characteristics or strength of the reaction gases may vary, and inasmuch as a stronger gas provides a more vigorous conversion reaction, which emits more heat, the reaction being exothermic, thereby tending to raise the temperature of the automatic gas cooled converter A, whereas this temperature should be kept at its proper value for optimum conversion, it becomes desirable to deliver stronger reaction gases at a lower preheat temperature and, of course, by similar reasoning, to deliver weaker reaction gases at a higher temperature. I therefore prefer to further regulate the temperature of the reaction gases before admitting them to the first conversion stage A.

Both of the foregoing problems I prefer to solve by the provision of an external or auxiliary heat exchanger interposed between the discharge opening 41 of the preheater and the inlet opening 2 of the first converter A. The arrangement is best shown in Fig. 3, in which it will be observed that in addition to the conversion and cooling stages A, B, and C there is provided a heat exchanger F, through which the reaction gases flow on their way from the preheater discharge opening 41 to the converter inlet opening 2. The heat exchanger F is supplied either with cold air or other cooling medium when it is desired to slightly cool the preheated reaction gases, or is supplied with gases of combustion or other heating medium when it is desired to slightly further preheat the reaction gases before their entry into the converter. The heating or cooling media are circulated through conduits 60 and 62. Heat exchanger F is supplied with gases of combustion when it is desired to start up the plant in order to preheat the reaction gases.

As is shown in Fig. 1, the catalytic masses 16 and 26, and the region therebetween, are provided with numerous pyrometric or temperature responsive elements 64, the readings of which are observed for manual control of the preheat temperature of the reaction gases through the use of the auxiliary heat exchanger F, or if desired, suitable valves on the heat exchanger may be arranged for automatic control.

Fig. 3 also illustrates a preferred mode of arranging the piping interconnecting the converter A, B, C, and the auxiliary heat exchanger F. The cool reaction gases are supplied through a main header or conduit 70, from which gases are led into the preheater inlet opening 37, valve 72 being closed. The preheated reaction gases flow out of the discharge opening 41 through pipe 74 and into the exchanger F. By fully opening the valve 72 the reaction gases may be caused to flow directly through the exchanger F in order to permit of preheating when the plant is being started up after a shut down period. In operation, if the variation from desired preheat temperature is in the direction of too much preheat accompanied by too cool a temperature in converter B the valve 72 may be opened slightly to permit the bypass of a portion of the cool reaction gases from the conduit 70, so that the resultant preheat temperature after the unheated and heated portions of the reaction gases are mixed may be adjusted to more nearly the correct and desired value.

As one example of the temperatures involved, the reaction gases may enter the converter at say 100 degrees Fahrenheit, and be preheated in the single acting heat exchange elements to a temperature of say 500 degrees F. These preheated reaction gases are then fed to the first converter stage, from which the gases leave at a temperature of say 850 degrees F. The converted gases leaving the final converter stage are cooled down by the heat exchange with the incoming cool gases to a temperature of say 300 degrees F.

The manner of constructing and operating the improved converter system of my invention and the numerous advantages thereof will in the main be fully apparent from the foregoing detailed description. It will be observed that reaction gases which are received substantially at atmospheric temperature are preheated to a suitable reaction temperature entirely within converter, and that the converted gases have been very substantially cooled within the converter itself preparatory to absorption. The final conversion stage is cooled and kept at the proper temperature for optimum conversion of the reaction gases without reversion. The heat exchange between the reaction gases and both the converted gases and the final catalyst mass is a true counter flow heat exchange, taking place in single acting heat exchange elements. The cool reaction gases are preheated to substantially the desired initial temperature for supply to the first conversion stage, yet further regulation is provided to obtain a variable control of this temperature in case of a variation in the strength of the reaction gases, so as to ultimately obtain the correct reaction temperatures within the converter, a feature which is of especial advantage when using the justly favored automatic gas cooled type of converter.

From one viewpoint it may be said that in a system of cascaded conversion stages the reaction gases are brought into counter flow heat exchange relation with each of the several contact masses in inverse order to the order of the conversion process, and thereafter are passed successively through the several contact masses. Furthermore, as a final stage, there is a counter flow heat exchange relation between the reaction gases and the converted gases, and this exchange also takes place within the converter. The preheated gases rise continuously upward in a very direct and unobstructed manner through the filter, the various conversion stages, and the cooling stage.

It will be apparent that while I have shown and described my invention in the preferred form, many changes and modifications may be made in the structure disclosed without departing from the spirit of the invention, defined in the following claims.

I claim:

1. In a converter for the manufacture of sulfuric anhydride by catalytic conversion comprising a conversion chamber and a heat exchanger including a heat exchange element comprising a plurality of pairs of empty concentric tubes arranged in flow communication with one another, and completely surrounded for at least a portion of their length by catalyst, one of each pair of tubes being heat insulated to prevent heat exchange therethrough.

2. A converter for the manufacture of sulfuric anhydride by catalytic conversion comprising a conversion chamber and a heat exchanger including a plurality of parallel single-action heat exchange elements comprising an outside tube having one closed and one open end and completely surrounded for at least a portion of its length by catalyst, an open ended inside tube arranged for flow communication with the closed end of the outside tube, said inside tube being heat insulated to prevent heat exchange between the inside and outside tubes, the heat exchange tubes containing no catalyst therein.

3. In a converter for the manufacture of sulfuric anhydride by catalytic conversion comprising a conversion chamber and a heat exchanger including a plurality of parallel single-acting heat exchange elements, comprising an outside tube having one closed and one open end and completely surrounded for at least a portion of its length by catalyst, an open ended inside tube arranged for flow communication with the closed end of the outside tube, said inside tube being constructed with a plurality of spaced walls to prevent heat exchange between the inside and outside tubes, the heat exchange tubes containing no catalyst therein.

4. A converter system comprising a first converter and a second converter each having a catalytic contact mass, single acting heat exchanger means in the second converter, double acting heat exchanger means in the first converter, means for feeding cool reaction gases to the single acting heat exchanger means for preheating, then to the double acting heat exchanger means, then through the contact mass of the first converter, and finally through the contact mass of the second converter.

5. A combination converter comprising a first converter and a second converter each having a catalytic contact mass, single acting heat exchanger means in the second converter, double acting heat exchanger means in the first converter, means for feeding cool reaction gases to the single acting heat exchanger means for preheating, then to the double acting heat exchanger means, then through the contact mass of the first converter, and finally through the contact mass of the second converter, the heat exchanger means in the second converter being of suitable area to give the reaction gases a desired preheat temperature, dependent upon the strength of said reaction gases.

6. A combination converter comprising a first converter and a second converter each having a catalytic contact mass, single acting heat exchanger means in the second converter, double acting heat exchanger means in the first converter, means for feeding cool reaction gases to the single acting heat exchanger means for preheating, then to the double acting heat exchanger means, then through the contact mass of the first converter, and finally through the contact mass of the second converter, the chamber of the second converter being relatively large and the heat exchanger means therein being of suitable area to cause substantial cooling of the converted gases in the second converter preparatory to absorption.

7. A converter comprising a relatively large chamber, a catalyst therein, tubes having closed inner ends extending through the chamber, open tubes passing into the open ends of the closed ended tubes and extending substantially to the closed ends thereof, said open ended tubes having double walls for heat insulation, and means for causing cool reaction gases to pass through the outer tubes and back through the inner tubes in order to cool the converted gases in the chamber preparatory to absorption, and to preheat the reaction gases preparatory to conversion.

8. A converter comprising a relatively large chamber, a catalyst therein, tubes having closed inner ends extending through the chamber and into the catalyst, open ended tubes passing into the open ends of the closed ended tubes and extending substantially to the closed ends thereof, said open ended tubes having double walls for heat insulation, and means for causing cool reaction gases to pass through the outer tubes and back through the inner tubes in order to cool the converted gases in the chamber preparatory to absorption, to prevent reversion, and to preheat the reaction gases preparatory to conversion.

9. A converter comprising a relatively large chamber, a catalyst in a portion thereof, two gas impermeable partitions at the empty portion of the top of the chamber, relatively long upright tubes having closed lower ends extending from the lower gas impermeable partition downward through the large chamber and finally into the catalyst at the bottom thereof, open ended tubes passing downwardly from the upper gas impermeable partition through the lower partition into the upper ends of the closed ended tubes and extending substantially to the lower ends thereof, said open ended tubes having double walls for heat insulation, and means for causing cool reaction gases to pass between the partitions downwardly through the outer tubes and upwardly through the inner tubes in order to cool the converted gases above the catalyst preparatory to absorption, to prevent reversion, and to preheat the reaction gases preparatory to conversion.

10. A converter system comprising a relatively large upper converter chamber, a catalyst therein, a gas permeable screen supporting the catalyst, two gas impermeable partitions at the top of the chamber, relatively long upright tubes having closed lower ends extending from the lower gas impermeable partition downward through the large chamber and finally into the catalyst at the bottom thereof, open ended tubes passing downwardly from the upper gas impermeable partition through the lower partition into the upper ends of the closed ended tubes and extending substantially to the lower ends thereof, said open ended tubes having double walls for heat insulation, means for causing cool reaction gases to pass between the partitions downwardly through the outer tubes and upwardly through the inner tubes in order to cool the converted gases above the catalyst preparatory to absorption, to prevent reversion, and to preheat the reaction gases, an automatic gas cooled first converter located directly beneath said second converter chamber, and means to feed the preheated reaction gases to the first converter, said gases after conversion passing upwardly through the gas permeable screen directly into the second converter.

INGENUIN HECHENBLEIKNER.